(12) United States Patent
Toda et al.

(10) Patent No.: US 9,333,797 B2
(45) Date of Patent: *May 10, 2016

(54) INFORMATION RECORDING MEDIUM AND METHOD OF READING INFORMATION RECORDING MEDIUM, AND IMAGE DETECTION APPARATUS

(71) Applicant: TOPPAN PRINTING CO., LTD., Tokyo (JP)

(72) Inventors: Toshiki Toda, Tokyo (JP); Harumi Oota, Tokyo (JP); Masami Inokuchi, Tokyo (JP); Yasushi Kishimoto, Tokyo (JP); Fang Chi Su, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/306,733

(22) Filed: Jun. 17, 2014

(65) Prior Publication Data

US 2014/0293424 A1    Oct. 2, 2014

Related U.S. Application Data

(63) Continuation of application No. 12/005,338, filed on Dec. 27, 2007, now Pat. No. 8,770,487, which is a continuation of application No. PCT/JP2007/058248, filed on Apr. 16, 2007.

(30) Foreign Application Priority Data

Apr. 27, 2006  (JP) ................................ 2006-123966
Apr. 28, 2006  (JP) ................................ 2006-127075
May 2, 2006   (JP) ................................ 2006-128251

(51) Int. Cl.
    *G06K 19/06*    (2006.01)
    *B44F 1/10*     (2006.01)
    (Continued)

(52) U.S. Cl.
    CPC ................ *B44F 1/10* (2013.01); *B42D 25/328* (2014.10); *G02B 5/1814* (2013.01); *G02B 5/1819* (2013.01); *G06K 19/06037* (2013.01); *B42D 25/29* (2014.10); *G06K 2019/0629* (2013.01)

(58) Field of Classification Search
    None
    See application file for complete search history.

(56) References Cited

U.S. PATENT DOCUMENTS 5,461,239 A   10/1995  Atherton
5,591,527 A    1/1997  Lu
                       (Continued)

FOREIGN PATENT DOCUMENTS

CN    1313579 A    9/2001
CN    1615226 A    5/2005
                   (Continued)

OTHER PUBLICATIONS

International Search Report of International Published Application No. PCT/JP2007/058248 (mailed Jul. 17, 2007).
(Continued)

*Primary Examiner* — Michael G Lee
*Assistant Examiner* — Tabitha Chedekel

(57) ABSTRACT

In an information recording medium, in which an information recording medium has diffraction grating cells arranged therein, a plurality of types of the diffraction grating cells make up one information recording area. At least one type of the diffraction grating cells included in the diffraction grating cells making up the information recording area are information recording elements, while the other types of the diffraction grating cells included in the diffraction grating cells making up the information recording area are information hiding elements. The information is recorded by two-dimensional arrangement of the diffraction grating cells constituting the information recording elements in the information recording area.

16 Claims, 11 Drawing Sheets

(51) Int. Cl.
    *G02B 5/18*     (2006.01)
    *B42D 25/328*     (2014.01)
    *B42D 25/29*     (2014.01)

(56) References Cited

U.S. PATENT DOCUMENTS

| | | | |
|---|---|---|---|
| 5,621,515 | A | 4/1997 | Hoshino et al. |
| 5,825,475 | A | 10/1998 | Formosa |
| 5,856,048 | A | 1/1999 | Tahara et al. |
| 6,061,122 | A | 5/2000 | Hoshino et al. |
| 6,065,400 | A | 5/2000 | Van Weverberg |
| 6,280,891 | B2 | 8/2001 | Daniel et al. |
| 8,770,487 | B2 * | 7/2014 | Toda .................. G02B 5/1814 235/375 |
| 2003/0019934 | A1 | 1/2003 | Hunter et al. |
| 2003/0039195 | A1 | 2/2003 | Long et al. |
| 2003/0174373 | A1 | 9/2003 | Drinkwater |
| 2005/0179967 | A1 | 8/2005 | Ogasawara |
| 2006/0055993 | A1 | 3/2006 | Kobayashi et al. |

FOREIGN PATENT DOCUMENTS

| | | |
|---|---|---|
| JP | 3-145603 | 6/1991 |
| JP | 7-57066 | 3/1995 |
| JP | 8-272923 | 10/1996 |
| JP | 11-306277 | 11/1999 |
| JP | 2001-297313 | 10/2001 |
| JP | 2002-90548 | 3/2002 |
| JP | 2002-228821 | 8/2002 |
| JP | 2002-268524 | 9/2002 |
| JP | 2003-15510 | 1/2003 |
| JP | 2003-186374 | 7/2003 |
| JP | 2003-215319 | 7/2003 |
| JP | 2003-295744 | 10/2003 |
| JP | 2004-280010 | 10/2004 |
| JP | 2004-302269 | 10/2004 |
| JP | 2005-172649 | 6/2005 |
| JP | 2005-310148 | 11/2005 |

OTHER PUBLICATIONS

International Preliminary Report on Patentability mailed on Nov. 27, 2008 and issued in corresponding International Patent Application No. PCT/JP2007/058248.
Chinese Office Action mailed on Jun. 12, 2010 in corresponding Chinese Patent Application 200780000648.7.
Japanese Office Action mailed on May 10, 2011 in corresponding Japanese Patent Application 2006-127075.
Chinese Office Action mailed on May 25, 2011 in corresponding Chinese patent application No. 200780000648.7.
Office Action issued Nov. 10, 2010 in U.S. Appl. No. 12/005,338.
Office Action issued Apr. 27, 2011 in U.S. Appl. No. 12/005,338.
Office Action issued Oct. 10, 2011 in U.S. Appl. No. 12/005,338.
Office Action issued Jun. 14, 2013 in U.S. Appl. No. 12/005,338.
Office Action issued Oct. 3, 2013 in U.S. Appl. No. 12/005,338.
Notice of Allowance issued Mar. 3, 2013 in U.S. Appl. No. 12/005,338.
U.S. Appl. No. 12/005,338, filed Dec. 7, 2007, Toshiki Toda et al., Toppan Printing Co., Ltd.
Office Action issued Nov. 10, 2011 in U.S. Appl. No. 12/005,338.

* cited by examiner

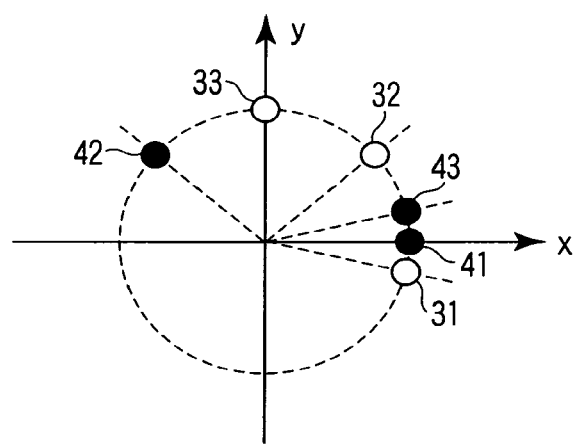
F I G. 7

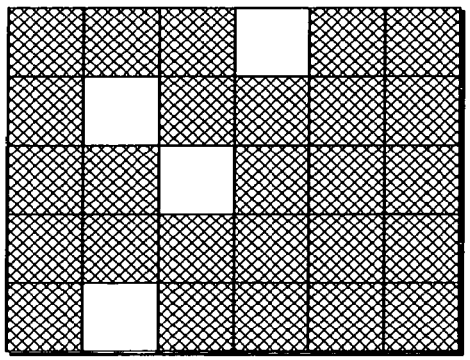
(a)
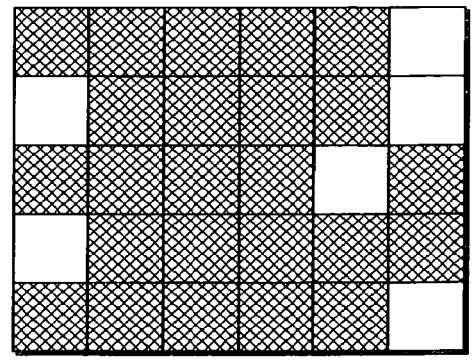
(d)
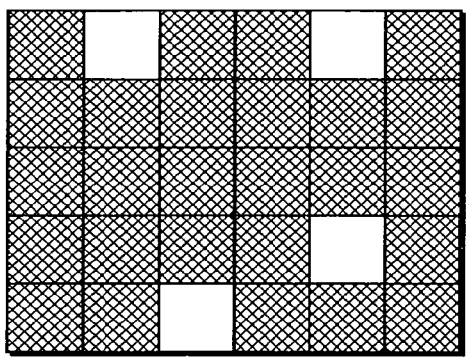
(b)
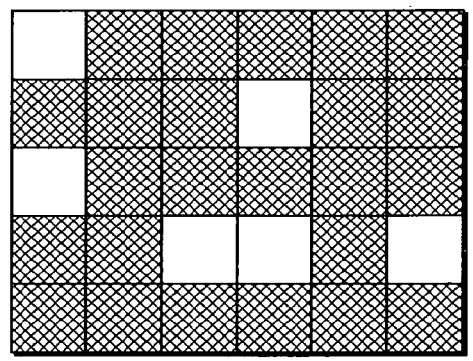
(e)
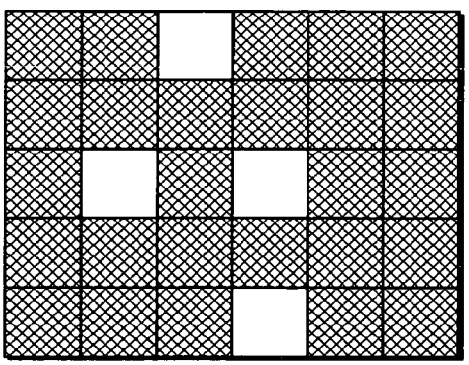
(c)
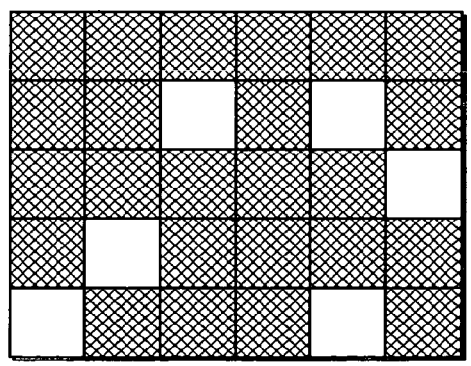
(f)
F I G. 8

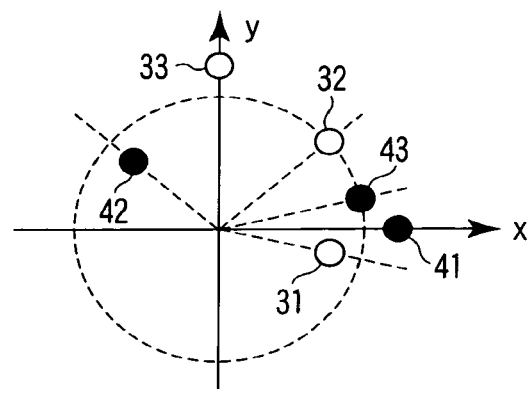
F I G. 9
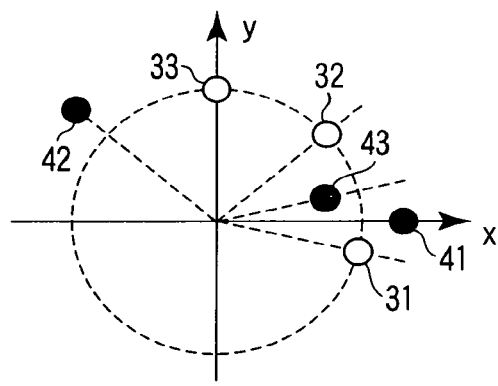
F I G. 10
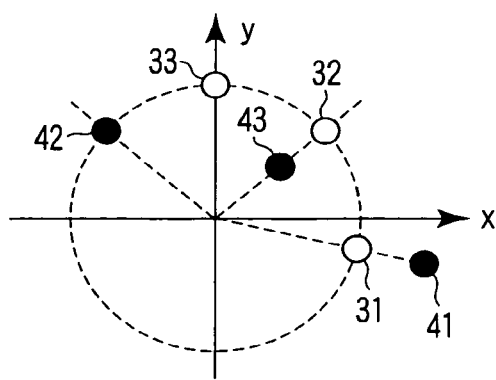
F I G. 11

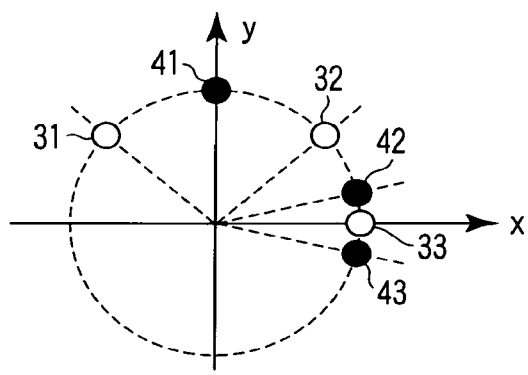
F I G. 12
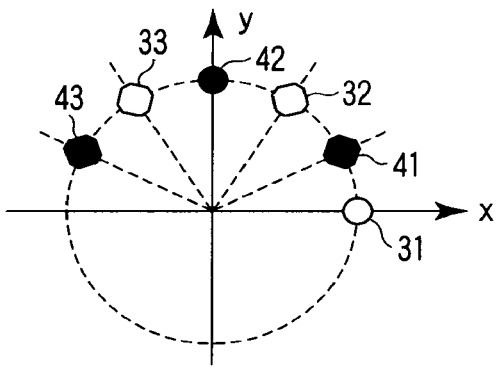
F I G. 13
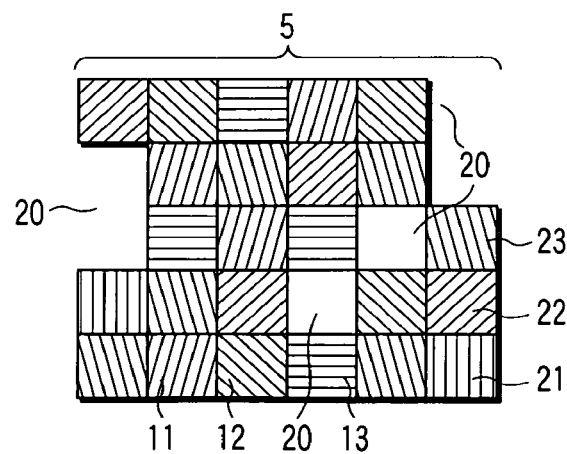
F I G. 14

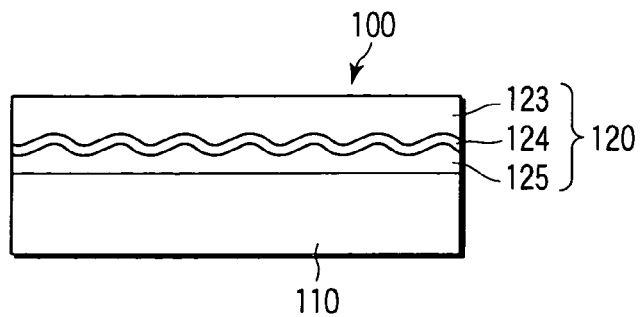
F I G. 15
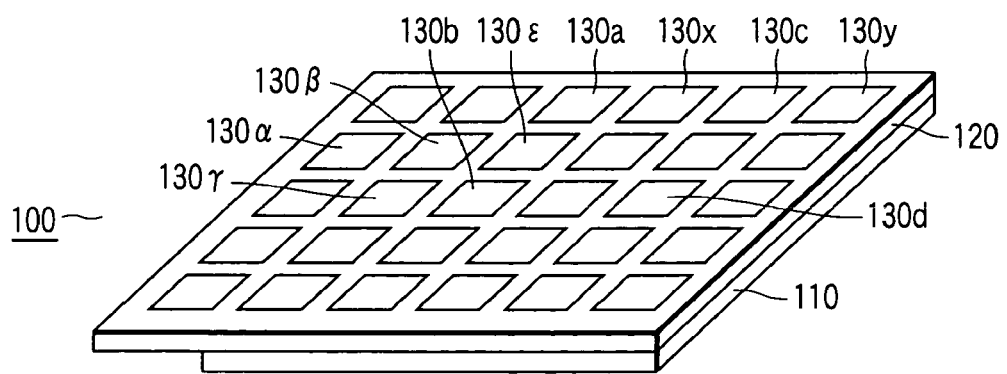
F I G. 16

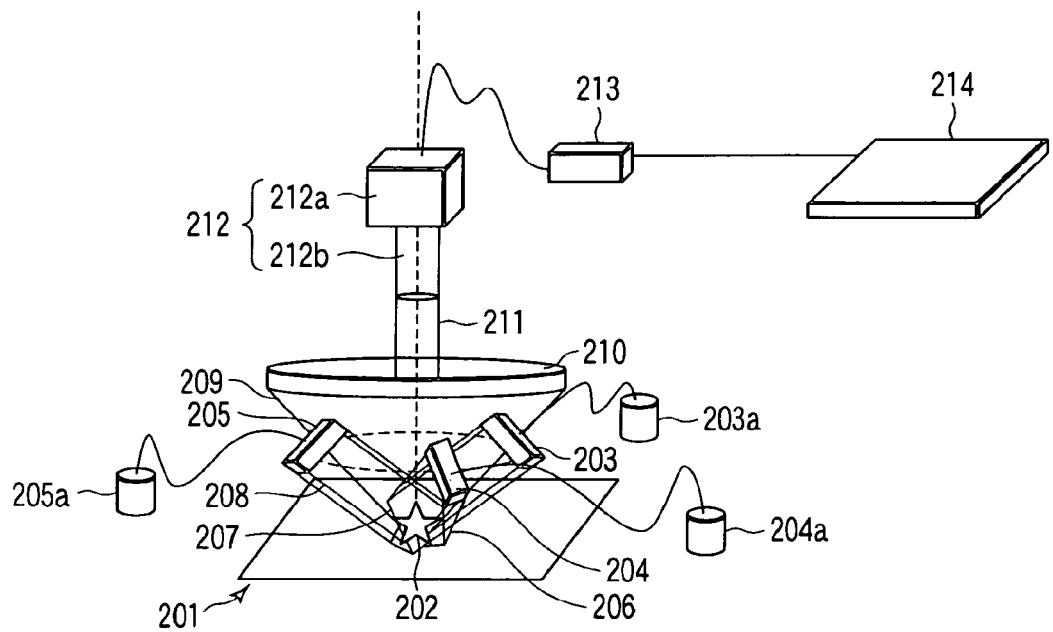
F I G. 21
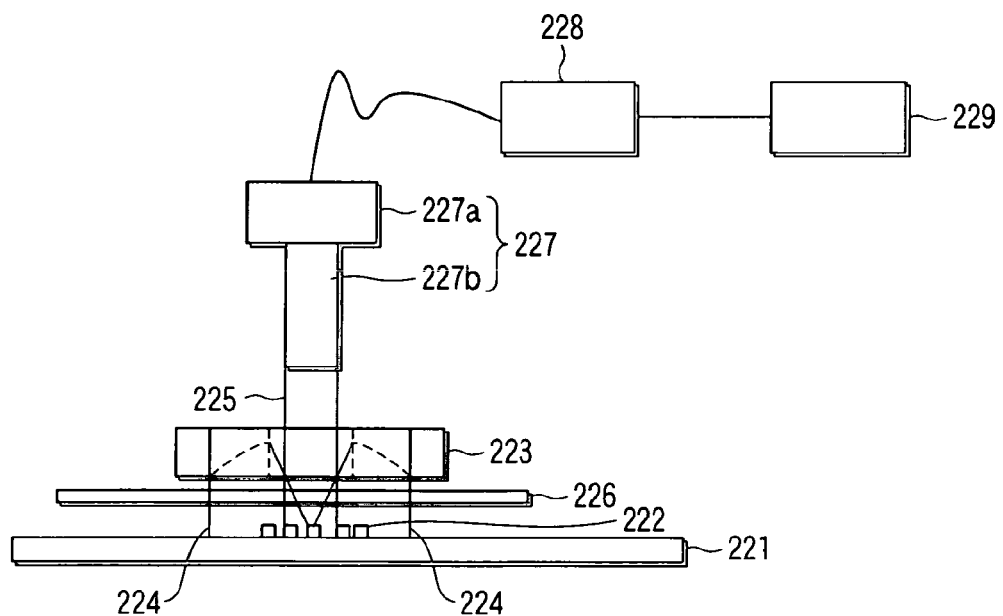
F I G. 22

INFORMATION RECORDING MEDIUM AND METHOD OF READING INFORMATION RECORDING MEDIUM, AND IMAGE DETECTION APPARATUS

CROSS-REFERENCE TO RELATED APPLICATIONS

This application is a continuation of U.S. application Ser. No. 12/005,338, filed Dec. 27, 2007, which is a Continuation Application of PCT Application No. PCT/JP2007/058248, filed Apr. 16, 2007, which was published under PCT Article 21(2) in Japanese.

This application is based upon and claims the benefit of priority from prior Japanese Patent Applications No. 2006-123966, filed Apr. 27, 2006; No. 2006-127075, filed Apr. 28, 2006; and No. 2006-128251, filed May 2, 2006, the entire contents of all of which are incorporated herein by reference.

BACKGROUND OF THE INVENTION

1. Field of the Invention

The present invention relates generally to an information recording medium for recording information using, for example, a diffraction grating, and further to a method of reading the information recorded on the information recording medium and an apparatus for detecting an image recorded on the information recording medium.

2. Description of the Related Art

Conventionally, a display unit formed of a diffraction grating or a hologram not only is used for decoration or one-point design but finds wide applications as an information recording medium by being built in a part of the design of a tradable coupon for security to prevent forgery or suppress duplication.

Such an information recording medium is formed in such a manner that an optical diffraction structure formed with a pattern by the hologram or the diffraction grating or the like to prevent forgery is foiled by thermal transfer to a plastic card, a tradable coupon or a high-priced prepaid card. The reason why this type of display unit is utilized as an anti-forgery means is that the fabrication of the optical diffraction structure is technologically so sophisticated that it is difficult to duplicate the same display unit.

Jpn. Pat. Appln. KOKAI Publication No. 2003-015510, for example, discloses a display unit for displaying an image by arranging a plurality of cells as pixels, characterized in that the cells are formed of a point-type computer hologram for recording preset information as an object light, and by changing the diffraction efficiency of each cell and thus changing the brightness of the pixels on the image, a gradation image can be displayed.

Also, Jpn. Pat. Appln. KOKAI Publication No. 2003-295744 discloses an optical information recording medium having an optical information recording unit configured to form a plurality of areas including a computer hologram on the surface of a base material, wherein the computer hologram is constituted of cells as component units for recording specific information independently. In this recording medium, at least two types of computer holograms including different carrier waves are arranged in a small area and the difference of the carrier waves is larger than the frequency bandwidth of the reproduction information from the computer hologram.

Further, Jpn. Pat. Appln. KOKAI Publication No. 2003-215319 discloses an authentication medium configured of a visual authentication unit including a diffraction structure having a hologram or a diffraction grating adapted to record an image reproducibly using visible light, and an authentication code unit formed to the size visually unrecognizable with unit images formed by the diffraction structure and arranged in a predetermined pattern thereby to make up an authentication code.

A technique for confirming whether the information recording medium is authentic with the correct information recorded is also disclosed.

In Jpn. Pat. Appln. KOKAI Publication Nos. 2003-015510 and 2003-295744 described above, cells (dots) making up "the mechanical read information" different from the pixels making up the decoration image are mixed in the hologram with each cell (dot) as a component unit, so that the authenticity is determined by taking advantage of the fact that the information unrecognizable to the naked eye appears at the time of the machine read operation.

BRIEF SUMMARY OF THE INVENTION

The aforementioned prior art, however, poses the following problem.

Specifically, a high anti-forgery effect is indispensable for the information recording medium of this type which is used for security applications. Also, the authenticity is required to be determined reliably.

Assume that the diffraction structure is reduced to a size incapable of visual recognition to improve the anti-forgery effect as in the medium disclosed in Jpn. Pat. Appln. KOKAI Publication No. 2003-215319. Then, a very high magnification and accuracy are required of the reader to read the diffraction structure. Also, the simple reduction of the diffraction structure to a size incapable of visual recognition cannot avoid the chance that the recording information is identified with comparative ease by the inspection using the magnifier or the like. Further, the simple diffraction grating or hologram structure poses the problem of the copying ease.

In the techniques disclosed in Jpn. Pat. Appln. KOKAI Publication Nos. 2003-015510 and 2003-295744 to realize positive authentication, assume that the object having the hologram is a paper article such as a negotiable instrument or passport. The surface unevenness of the paper has an effect on the unevenness of the interference fringe structure making up the machine read information, and the recorded information cannot be accurately reproduced. For this reason, a technique is indispensable by which stable read operation is possible regardless of the surface unevenness of the base paper material.

A method of reading the display unit printed on the paper is disclosed in Jpn. Pat. Appln. KOKAI Publication No. 2005-172649 in which the print to be inspected is irradiated with white ring light, a pattern image is picked up with a camera, and the image thus picked up is compared with a reference data thereby to inspect the print quality.

In the case where the image is detected by this method, however, the surface unevenness of the substrate on which the detected image is arranged has so large an effect that the substrate on which the detected image is arranged is limited.

Specifically, in the case where the substrate is paper, the center line surface roughness Ra of the substrate surface not smaller than 1.0 would deform the read information stacked on the surface following the unevenness of the substrate surface. Thus, the original uneven pattern would be lost and wrong information may be read.

This invention has been achieved in view of the above situation, and a primary object thereof is to provide an information recording medium capable of recording information with a high information hidability without reducing the anti-forgery effect.

A second object of the invention is to provide an information reading method and an image detection apparatus capable of reading information accurately from the information recording medium having a high information hidability thereby to realize reliable authentication.

In order to achieve these objects, the present invention includes the following means.

A first aspect of the present invention provides an information recording medium including an arrangement of diffraction grating cells constituting cells each formed of a diffraction grating, wherein a plurality of types of the diffraction grating cells make up one information recording area, at least one type of the diffraction grating cells included in the diffraction grating cells making up the information recording area are information recording elements, the other types of the diffraction grating cells included in the diffraction grating cells making up the information recording area are information hiding elements, and information is recorded in a two-dimensional arrangement of the diffraction grating cells constituting the information recording elements in the information recording area.

A second aspect of the present invention provides an information reading method, wherein at the time of reading, by radiating illumination light rays on the information recording area, information recorded in the information recording area on the above-described information recording medium, the illumination light rays are rendered to enter each diffraction grating making up the information recording elements in the information recording area from the direction in which the light rays diffracted by diffraction of the illumination light rays substantially coincide with each other, and an image formed by the diffraction light rays on the information recording medium is picked up by imaging means arranged in such a direction that the diffraction light rays are substantially coincident with each other thereby to read the information from this imaging result.

A third aspect of the present invention provides an information recording medium comprising a first layer and a transparent second layer stacked on the first layer and including a light reflection layer, wherein a plurality of minuscule diffraction grating elements each having a diffraction grating holding the whole or part of hidden information are arranged on the surface of the second layer, a grating pitch and a grating angle are set in such a manner that the whole or part of light rays diffracted by the diffraction grating elements based on the illumination light from a light source enter a predetermined spatial area, and in the case where the whole or part of the diffraction light rays from a diffraction grating element group including a combination of at least two diffraction grating elements enter the predetermined area, and a sum of reproduction information in the predetermined area is developed as predetermined one or plurality of hidden information. A predetermined color and a predetermined pattern are arranged on the first layer in accordance with arrangement of the diffraction grating elements holding the hidden information.

A fourth aspect of the present invention provides an apparatus for authenticating hidden information recorded on the information recording medium according, comprising: a light source which radiates illumination light having a predetermined light quantity and a predetermined wavelength distribution; reading means for reading the hidden information developed by a combination of the light rays diffracted, through the diffraction grating elements, from the illumination light rays radiated on the diffraction grating elements from the light source; and authentication means for authenticating the hidden information based on the information read by the reading means.

A fifth aspect of the present invention provides an apparatus for authenticating hidden information recorded on the information recording medium, comprising: a light source which radiates white light; reading means for reading the hidden information developed by a combination of the light rays diffracted, through the diffraction grating elements, from the illumination light rays radiated on the diffraction grating elements from the light source; and authentication means for authenticating the hidden information based on the information read by the reading means.

A sixth aspect of the present invention provides an apparatus for authenticating hidden information recorded on the information recording medium, comprising: a light source which radiates illumination light rays of a color in the same color group as or complementary to a predetermined color of a pattern arranged on a first layer corresponding to diffraction grating elements holding the hidden information and on the first layer corresponding to diffraction grating elements around the diffraction grating elements holding the hidden information; reading means for reading the hidden information developed by a combination of the light rays diffracted, through the diffraction grating elements, from the illumination light rays radiated on the diffraction grating elements from the light source; and authentication means for authenticating the hidden information based on the information read by the reading means.

A seventh aspect of the present invention provides an image detection apparatus comprising: a light source which illuminates a detected image arranged on a sheet of a recording medium; optical means for extracting reflected light rays in a predetermined angular range included in reflected light rays from the detected image by the illumination from the light source; imaging means for imaging the detected image by receiving the reflected light rays in a predetermined angular range extracted by the optical means; conversion means for producing detected image information by converting information imaged by the imaging means into an electrical signal; and processing means for processing the detected image information obtained by the conversion means in accordance with a predetermined rule. The light source includes a plurality of diffused light sources arranged on a concentric circle around an optical path connecting the imaging means and the detected image.

An eighth aspect of the present invention provides an image detection apparatus comprising: a light source which illuminates a detected image arranged on a sheet of a recording medium; optical means for extracting reflected light rays in a predetermined angular range included in reflected light rays from the detected image by the illumination from the light source; imaging means for imaging the detected image by receiving the reflected light rays in a predetermined angular range extracted by the optical means; conversion means for producing detected image information by converting information imaged by the imaging means into an electrical signal; and processing means for processing the detected image information obtained by the conversion means in accordance with a predetermined rule. The light source is an annular diffused light source with the center of the circle located on an optical path connecting the imaging means and the detected image.

A ninth aspect of the present invention provides an image detection apparatus comprising: a light source which illuminates a detected image arranged on a sheet of a recording medium; optical means for extracting illumination light rays in a predetermined angular range included in illumination light rays from the light source; imaging means for imaging the detected image by receiving reflected light rays from the detected image by the illumination light rays extracted by the optical means; conversion means for producing detected image information by converting information imaged by the imaging means into an electrical signal; and processing means for processing the detected image information obtained by the conversion means in accordance with a predetermined rule. The light source is an annular diffused light source with the center of the circle located on an optical path connecting the imaging means and the detected image.

BRIEF DESCRIPTION OF THE SEVERAL VIEWS OF THE DRAWING

FIG. 7 is a plan view showing an example of arrangement of illumination light sources used in the method of reading information from the information recording medium according to the first embodiment.

FIG. 8 is a diagram for explaining an example of read operation for each type of the diffraction grating cell in the exemplary configuration shown in FIG. 2.

FIG. 9 is a plan view showing another example of arrangement of the illumination light sources used for the method of reading information from the information recording medium according to the first embodiment.

FIG. 10 is a plan view showing another example of arrangement of the illumination light sources used for the method of reading information from the information recording medium according to the first embodiment.

FIG. 11 is a plan view showing another example of arrangement of the illumination light sources used for the method of reading information from the information recording medium according to the first embodiment.

FIG. 12 is a plan view showing another example of arrangement of the illumination light sources used for the method of reading information from the information recording medium according to the first embodiment.

FIG. 13 is a plan view showing another example of arrangement of the illumination light sources used for the method of reading information from the information recording medium according to the first embodiment.

FIG. 14 is a plan view showing another example of the configuration of the information recording area in the information recording medium according to the first embodiment.

FIG. 15 is a sectional view showing an example of the configuration of an information recording medium according to a second embodiment.

FIG. 16 is a perspective view showing an example of the configuration of the information recording medium according to the second embodiment.

FIG. 21 is a conceptual diagram showing an example of the configuration of an image detection apparatus according to a third embodiment.

FIG. 22 is a conceptual diagram showing another example of the configuration of the image detection apparatus according to the third embodiment.

DETAILED DESCRIPTION OF THE INVENTION

The best mode for carrying out the invention will be explained below with reference to the drawings.

(First Embodiment)

Figure 1:
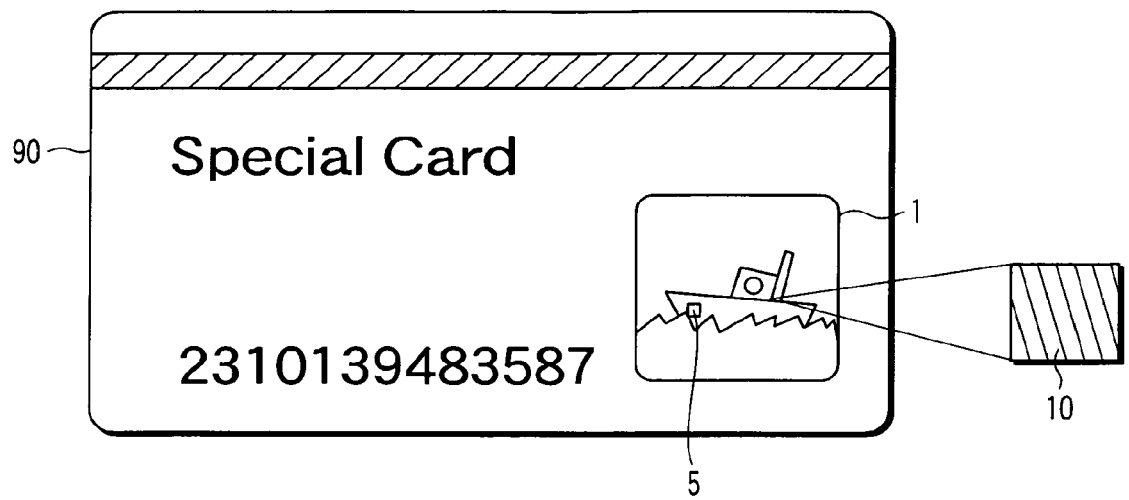
FIG. 1 is a conceptual diagram showing an example of an information recording medium transferred to a card according to a first embodiment.

Specifically, an information recording medium 1 according to a first embodiment of the invention, as shown in FIG. 1, has arranged therein diffraction grating cells 10 formed of a diffraction grating, and is used by being transferred to, for example, a card 90 or the like similarly to a normal hologram. Also, FIG. 1 shows an example in which an information recording area 5 is formed in a part of the information recording medium 1 with a pattern expressed by the diffraction grating cells 10.

Figure 2:
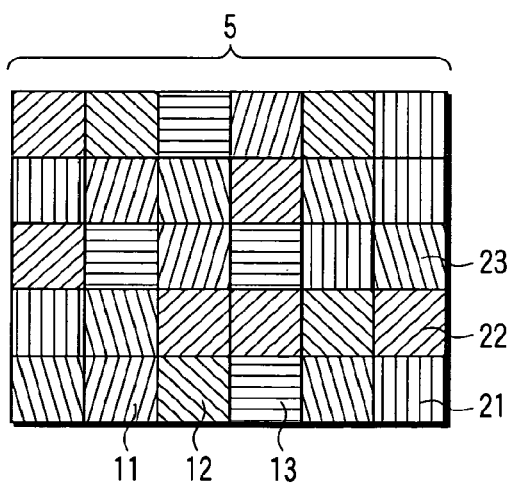
FIG. 2 is a plan view showing an example of the configuration of an information recording area in the information recording medium according to the first embodiment.
Figure 3:
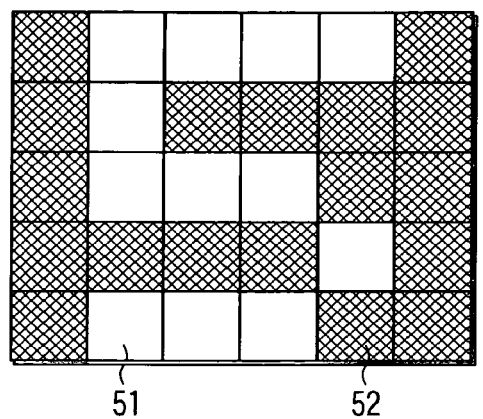
FIG. 3 is a schematic diagram showing an example of information read from the information recording area having the configuration shown in FIG. 2.

In this information recording medium 1, as shown by the plan view of FIG. 2, each information recording area 5 is configured of a plurality of types of diffraction grating cells. Of all the plurality of diffraction cells making up the information recording area 5, at least one type of the diffraction grating cells are used as information recording elements (in this example, three types of diffraction grating cells are used as information recording elements 11, 12, 13), while the other types of the diffraction grating cells are used as information hiding elements (in this example, three types of diffraction grating cells are used as information hiding elements 21, 22, 23). By two-dimensionally arranging the diffraction grating cells making up the information recording elements 11, 12, 13 in the information recording area 5, the information such as the numeral "5" shown in FIG. 3 is recorded. As long as the illumination light is radiated under correct illumination conditions as described later with each diffraction grating cell as a pixel, therefore, the numeral as shown in FIG. 3 is displayed from the illumination light diffracted through the diffraction grating cells. The numeral is not of course limited to "5", but information such as a character and an image can also be recorded.

As shown in FIG. 2, in the case where the object on which the information recording area 5 is to be formed is a paper base material, not the structure having a complicated interference fringe such as a computer hologram but the latent incorporation of the code information formed of a combination of the diffraction grating cells having a linear grating fringe in the decoration image, for example, is suitable for assuring stable read operation regardless of the surface unevenness.

A plurality of diffraction grating cells including the information recording elements and/or the information hiding elements may be arranged in the area other than the information recording area 5.

Further, with this information recording medium 1, the visual discrimination of the presence of the information recording area 5 is made difficult by appropriately setting the grating interval and the grating angle of the diffraction grating making up the diffraction grating cells.

Figure 4:
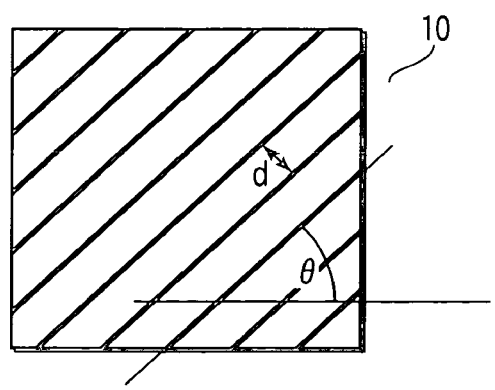
FIG. 4 is a plan view showing an example of the configuration of a diffraction grating cell.

As an example, those diffraction grating cells making up the information recording area 5 which are of different types are rendered to have different grating angles. Referring to FIG. 2, the diffraction grating cell making up the information recording element 11, the diffraction grating cell making up the information recording element 12, the diffraction grating cell making up the information recording element 13, the diffraction grating cell making up the information hiding element 21, the diffraction grating cell making up the information hiding element 22 and the diffraction grating cell making up the information hiding element 23 have different grating angles θ (FIG. 4).

In another example, the grating angles θ between different types of the diffraction grating cells making up the information recording area 5 are rendered to have a predetermined angular difference or an angular difference equal to an integer multiple of the predetermined angular difference. Referring to FIG. 2, the predetermined angular difference is 15°, for example, between the grating angle θ of the diffraction grating cell making up the information recording element 11 and the grating angle θ of the diffraction grating cell making up the information recording element 12. Another example of this case is that the difference between the grating angle θ of the diffraction grating cell making up the information recording element 11 and the grating angle θ of the diffraction grating cell making up the information hiding element 22 is 30° which is twice as large as 15°.

In still another example, those of the diffraction grating cells making up the information recording area 5 which are different in type have the same grating pitch. In FIG. 2, for example, the diffraction grating having the diffraction grating cell making up the information recording element 11 and the diffraction grating having the diffraction grating cell making up the information recording element 12, though different in type, have the same grating pitch d (FIG. 4).

In yet another example, at least two types of different diffraction grating cells included in the diffraction grating cells making up the information recording area 5 are configured of diffraction gratings having different grating pitches d. In FIG. 2, for example, the diffraction grating cell making up the information recording element 11 and the diffraction grating cell making up the information recording element 12 have different grating pitches d from each other.

In a further example, the information recording elements and the information hiding elements included in the diffraction grating cells making up the information recording area 5 are configured of diffraction gratings having different grating pitches. In FIG. 2, for example, the diffraction grating cell making up the information recording element 11 and the diffraction grating cell making up the information hiding element 22 have different grating pitches from each other.

In the information recording medium according to this embodiment described above, the type of the diffraction grating used for the diffraction grating cells 10 can be appropriately selected. From the viewpoint of mass productivity, however, the diffraction grating of surface relief type is preferable. In the case where the diffraction grating of surface relief type is used, as shown by the plan view of FIG. 4, the typical grating pitch d of the diffraction grating according to this embodiment is about 0.5 to 2 μm (1 μm=$10^{-6}$ m) and the height of the typical grating is about 0.1 to 1 μm.

In the case where the length of one side of each diffraction grating cell 10 is not more than 300 μm, individual diffraction grating cells 10 cannot be distinguished from each other under normal conditions for observation, thereby improving the effect of forgery prevention, design ability and the decoration ability. More preferably, the length of one side of each information recording area is not more than 1 mm, in which case the arrangement of the diffraction grating cells 10 recorded therein cannot be distinguished easily.

The information recording area 5, as shown in FIG. 12, is a mass of the diffraction grating cells 10, which are divided into the information recording elements 11, 12, 13 required for reading information and the information hiding elements 21, 22, 23 playing the role of hiding information. By increasing the types of the information recording elements 11, 12, 13 and the information hiding elements 21, 22, 23, the analysis of the structure becomes virtually impossible thereby preventing the forgery. Especially, by arranging the information recording elements 11, 12, 13 or the information hiding elements 21, 22, 23 in relative positions at random or in accordance with an appropriate rule, the information hiding ability is improved.

Figure 5:
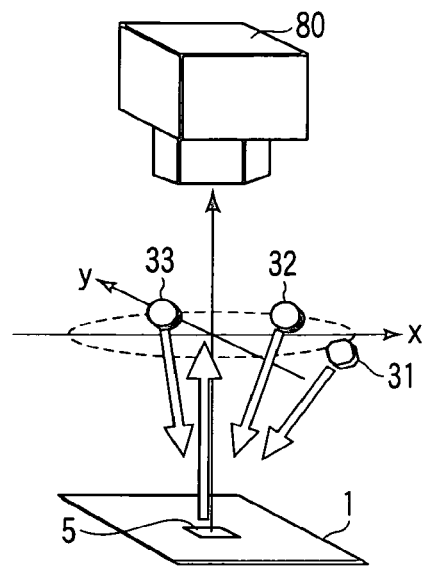
FIG. 5 is a conceptual diagram for explaining a method of reading information from the information recording medium according to the first embodiment.

With the configuration of the information recording area 5 as shown in FIG. 2, the information indicating numeral "5" can be read in accordance with the relative positions of the information recording elements 11, 12, 13. In fact, if such result of reading is to be obtained, the illumination suitable for the information recording elements 11, 12, 13 is required. As a specific example, a reading method corresponding to the information recording area 5 of FIG. 2 is shown in FIG. 5. In this case, an imaging means 80 such as a camera reads a two-dimensional pattern of the information recording elements 11, 12, 13 in the information recording area 5 by receiving the diffracted light.

The information read from the information recording medium 1 according to this embodiment is a two-dimensional layout pattern as shown in FIG. 3, and therefore, a great amount of information can be obtained in one read session. The great information amount leads to an improved effect of forgery prevention. In addition to the character shown in FIG. 3, a pattern or an image can be appropriately selected as a two-dimensional layout pattern. In FIG. 3, the numerical information of "5" can be read from the layout pattern including information recording elements 51 acting as an information signal portion as indicated by white and information hiding elements 52 acting as an information background portion as indicated by black.

In this way, a general image processing technique is applicable to the result of reading the information recording medium 1 according to the invention, thereby making it possible to improve the read stability and the anti-forgery effect. Especially, by using the two-dimensional bar code as a pattern, the incompleteness of the layout pattern that has been read can be corrected to some degree, and more stable reading result is obtained.

Figure 6:
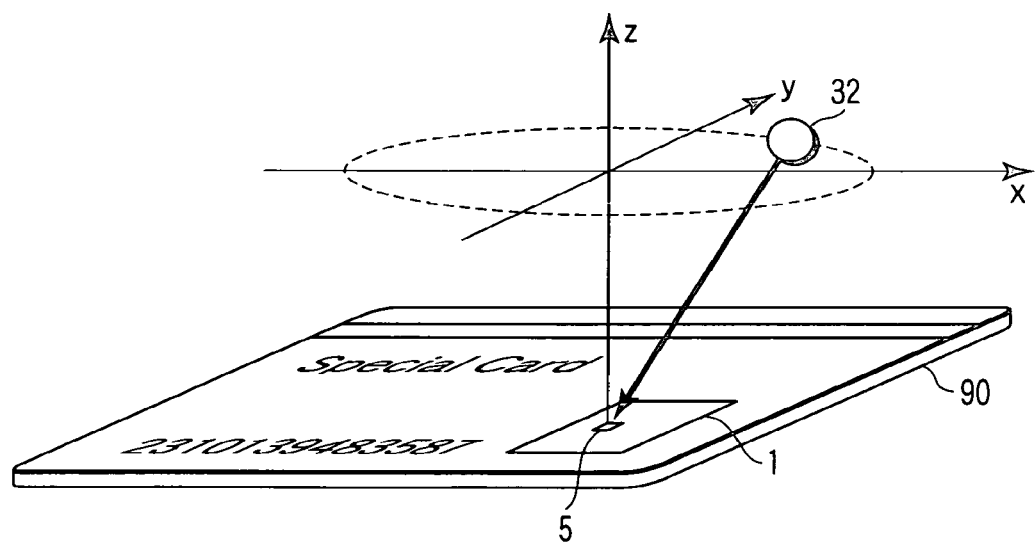
FIG. 6 is a perspective view showing an example of arrangement of an illumination light source used in the method of reading information from the information recording medium according to the first embodiment.

FIG. 6 shows an illumination light source 32 adapted for the information recording elements 12. From the viewpoint of simplification of the explanation and practicability, assume that a two-dimensional pattern (with the two-dimensional arrangement of the diffraction grating cells) expressed by the diffracted light is read by observing or imaging in z direction (the direction perpendicular to the diffraction grating plane).

Generally, an emission angle β of the most typical first-order diffracted light is determined by the following formula in the plane orthogonal to the grating lines of the diffraction grating.

$$d=\lambda/(\sin\alpha-\sin\beta) \quad (1)$$

where d is the grating pitch of the diffraction grating, λ the wavelength of the incidence light (corresponding to the color observed) and α the emission angle of the 0-order diffracted light (the transmitted illumination light or the regularly reflected illumination light). In other words, α directly corresponds to the incidence angle.

In the case where the conditions under which the diffracted light is emitted in the direction perpendicular to the grating surface are employed as typical conditions, the emission angle β of the first-order diffracted light is 0°. Then, assuming that the angle of the 0-order diffracted light is $\alpha_N$, Equation (1) is simplified into Equation (2) as follows.

$$d=\lambda/\sin\alpha_N \quad (2)$$

Specifically, if the conditions for emitting the diffracted light having a specified wavelength in the direction perpendicular to the grating plane are to be met, the correspondence between the grating pitch d and the angle $\alpha_N$ of incidence of the illumination light with respect to the normal to the diffraction grating plane is required to be expressed by Equation (2). The incidence angle of the illumination light, therefore, is defined by Equation (2).

From the fact described above, once the conditions for the diffraction grating are determined, the corresponding conditions of the illumination light are such that the change in grating angle (direction of grating line) corresponds to the change in the incidence direction of the illumination light around the normal to the diffraction grating plane as a rotation axis, and the change in the grating pitch d corresponds to the change in the incidence angle $\alpha_N$ of the illumination light with respect to the normal to the diffraction grating plane. This relation between the diffraction grating and the illumination light is not limited to the vertical direction, but the correspondence can be grasped similarly by considering the spatial component of Equation (1) separately in the generalized conditions.

In the information recording area of the information recording medium according to this embodiment, therefore, the use of the diffraction grating cells having different angles or grating pitches of the diffraction grating and the incidence of the illumination light from the direction and angle corresponding to the diffraction grating constituting the information recording element makes it possible to read the information as a two-dimensional pattern very easily by picking up an image from a specified direction (for example, the direction perpendicular to the grating plane). In the process, the degree of strength of the diffracted light hardly has a large effect on the detection result of the two-dimensional pattern, and therefore, a very stable information read operation can be realized. In the case where the right information is read, therefore, the authenticity can be positively determined by recognizing that the information recording medium is authentic. Incidentally, the illumination light as many as the types of the diffraction grating cells used as the information recording elements can be radiated at the same time from as many corresponding directions to read the information at a time, or the patterns obtained by radiation of the illumination light separately from each other may be combined to read the information. The former can produce the result of the read operation easily and instantaneously, while the latter makes possible more accurate authentication by using the individually read patterns as one of the materials for authentication.

Also, as long as the right illumination light is not applied, the diffracted light from the information hiding elements is also observed, and therefore, the right information cannot be read nor is it possible to determine which information is to be read, thereby exhibiting a high anti-forgery effect and information hidability.

Further, in view of the fact that the information recording medium according to this embodiment is configured as a mass of multiple types of diffraction grating cells, the complete forgery by total structural analysis is actually very difficult, and therefore, a high anti-forgery effect can be realized. Especially, the types and layout of the individual diffraction grating cells included and not included in the information recording area make it impossible for the third party to determine where the information recording area is existent on the information recording medium, thereby realizing a higher effect of forgery prevention. Also, even in the case where a forged article visually similar to an authentic article is produced, the use of preset illumination light makes it possible to discriminate the forgery easily and positively based on the result of reading the information from the information recording area.

The layout of the illumination light corresponding to the information recording area 5 shown in FIG. 2 with the xy plane of FIG. 6 as a reference plane is shown in FIG. 7. In FIG. 2, with the grating pitch d of the diffraction grating cells being constant, the illumination light sources can be arranged on a specified arc. The illumination light sources 31, 32, 33 are suitable for the information recording elements 11, 12, 13, respectively. Illumination light sources 41, 42, 43 corresponding to the magnitude of the illumination light sources 31, 32, 33, respectively, correspond to the information hiding elements 21, 22, 23, respectively. Therefore, the right information can be read only in the case where the light is radiated from the illumination light sources 31, 32, 33 on the information recording area 5 shown in FIG. 2. In the case where any one of the illumination light sources 41, 42, 43 is used, on the other hand, the right information cannot be obtained even though the diffracted light can be read. With regard to the other illumination light, the diffracted light cannot be emitted in a predetermined direction, and therefore, the right information cannot be read either.

Therefore, only those in the knowledge of the conditions for the illumination light sources 31, 32, 33 can read the right information. Also, according to this embodiment, the illumination light sources are not arranged at uniform angles with respect to the z-axis as the center axis and the relative positions of the information recording elements 11, 12, 13 and the information hiding elements 21, 22, 23 are not constant. Therefore, the layout of the illumination light sources 31, 32, 33 is difficult to analyze correctly for an improved anti-forgery effect.

FIGS. 8A to 8F show the result that can be read in the case where the illumination light sources 31, 32, 33, 41, 42, 43 are used one each. Of all of these drawings, the correct reading result coinciding with FIG. 3 can be obtained by superimposing FIGS. 8A, 8B and 8C. The correct result can be obtained, therefore, by applying all the illumination light at the same time or separately from each other. Also, in the case where the result of applying the illumination light separately from each other or the pattern of the result of combining several ones of the illumination light is used for authenticating the information, the legitimacy of the information that has been read can be substantiated. Thus, the forged articles or the like can be eliminated more positively, and the authenticity can be determined more accurately, thereby realizing a very high anti-forgery effect.

FIGS. 9 to 13 show examples of layout of the illumination light sources 31, 32, 33, 41, 42, 43 for another example of the information recording medium 1 according to this embodiment.

FIG. 9 shows an example in which the grating pitch of the diffraction grating cells 10 in the information recording area 5 is changed. By changing and setting the grating pitch in a complicated way as in this case, the information hidability is increased for an improved anti-forgery effect.

FIG. 10 shows an example of the case in which the grating pitch of the diffraction grating cells 10 constituting the information recording elements 11, 12, 13 in the information recording area 5 is kept constant, while the grading space of the diffraction grating cells constituting the information hiding elements 21, 22, 23 is changed. Specifically, the grating pitch of the information recording elements 11, 12, 13 is not included in the grating pitch of the information hiding elements 21, 22, 23, so that the information can be easily and positively read by the concentric or annular arrangement of the light sources.

FIG. 11 shows another example of the case in which the grating pitch of the diffraction grating cells 10 constituting the information recording elements 11, 12, 13 in the information recording area 5 is kept constant, while the grading space of the diffraction grating cells 10 constituting the information hiding elements 21, 22, 23 is changed. Specifically, the grating pitch of the information recording elements 11, 12, 13 is partly included in the grating pitch of the information hiding elements 21, 22, 23, so that the correct information cannot be read with a simple annular light sources for an improved hidability on the one hand, and the information can be easily and positively read by the concentric arrangement of the light sources or an annular arrangement of partly masked annular light sources on the other hand.

FIG. 12 shows an example of the case in which the grating pitch of the diffraction grating cells 10 in the information recording area 5 is kept constant, and the grating angle of the information recording elements 11, 12, 13 and the information hiding elements 21, 22, 23 is so set that the illumination light thereof alternate with each other. By doing so, an attempt to read the information using a large illumination source makes it easy to read the diffracted light also from the information hiding elements 21, 22, 23. Therefore, those not informed of the correct illumination conditions cannot easily read the correct information, thereby producing a high anti-forgery effect.

FIG. 13 shows an example having an isometric grating angle in the case of FIG. 11. In this configuration, each illumination light source can be formed in a slightly larger size so that the correct information can be read steadily even if the state of the information recording area 5 is somewhat changed. Also, since the illumination light source has some margin in size and position, an inexpensive reader can be formed in a simple configuration.

FIG. 14 is a plan view showing another example of the configuration of the information recording area 5 in the information recording medium 1 according to this embodiment. Specifically in FIG. 14, within the information recording area 5, areas 20 free of the diffraction grating cells are formed as information hiding elements in addition to the information hiding elements 21, 22, 23. This configuration makes it possible to further complicate the information recording area 5 without increasing the types of the diffraction grating cells thereby further contributing to the forgery prevention.

Examples of the embodiment in which one information recording area 5 is formed in the information recording medium have been explained above. Nevertheless, the information recording medium according to this embodiment is not limited to the provision of one information recording area 5 but two or more information recording areas may be provided.

In the case where a plurality of the information recording areas 5 are arranged in the information recording medium 1, the types of the diffraction grating cells arranged as information recording elements are required to be different from each other in at least two information recording areas 5. As an alternative, the diffraction grating cells arranged as information recording elements in one information recording area are arranged as information hiding elements in another information recording area.

The provision of a plurality of the information recording areas as described above can desirably improve both the anti-forgery effect and the reading accuracy.

Also, the information recording elements 11, 12, 13 and the information hiding elements 21, 22, 23 are not limited to the three types illustrated, but the types thereof can be appropriately selected. Especially, an increased number of the types of the diffraction grating cells leads to an improved anti-forgery effect.

As explained above, the information recording medium according to this embodiment can record the information with a high information hidability without reducing the anti-forgery effect.

Also, the information can be accurately read from the information recording medium having a high information hidability, thereby providing an information reading method capable of realizing highly reliable authentication.

(Second Embodiment)

An information recording medium 100 according to this embodiment, having a diffraction grating and intended to hold hidden information utilizing the diffraction grating, is configured of an information supporting layer 110 including a print layer, etc., stacked on a substrate and an information holding layer 120 stacked on an upper surface of the information supporting layer 110 as shown in the sectional view of FIG. 15. The information supporting layer 110 is not limited to the structure in which the print layer, etc., is stacked on the substrate, but a colored substrate on which no print layer is stacked may be used. As an alternative, a directly printed substrate may be used. Such an information recording medium 100 authenticates the information supporting layer 110 through the hidden information held therein. In the case where the information supporting layer 110 is paper money or securities or any of various certificates, the presence of the hidden information can authenticate the very information supporting layer 110, or otherwise exposes it as a forgery. In the case where the information supporting layer 110 is a packaging material, on the other hand, the authenticity of the contents packaged in the information supporting layer (packaging material) 110 can be determined.

This hidden information cannot be read with the naked eye but with a special reader, and is held on the information recording medium 100 with the configuration described below.

Specifically, the information holding layer 120 includes a light reflection layer 124. The information recording medium 100 shown in FIG. 15 has a bonding layer 125 for bonding the light reflection layer 124 to the information supporting layer 110. Nevertheless, another layer may be interposed between the information supporting layer 110 and the light reflection layer 124. The information supporting layer 110 shown in this case is formed of a colored or patterned substrate, or a colored or patterned print layer, etc., is stacked on the substrate. Incidentally, the information holding layer 120 has a protective layer 123 on the upper surface of the light reflection layer 124 whereby the light reflection layer 124 is protected from dirt and scratches.

Also, as shown in FIG. 16, the information recording medium 100 having the diffraction grating is formed with a plurality of minuscule diffraction grating elements 130 arranged on the surface of the substrate. These diffraction grating elements 130, holding the whole or part of the hidden information, have the grating pitch and the grating angle set in such a manner that the illumination light, which may be radiated from a predetermined light source, is scattered into scattered light and diffracted into diffracted light by the diffraction grating elements 130, both entering a predetermined spatial area. Also, the information recording medium 100 includes a diffraction grating element group having at least two diffraction grating elements 130 combined. In this case, a pattern making up a dummy can be mixed in an area lacking the plural diffraction grating elements 130.

More specifically, the information recording medium 100 having the diffraction grating is formed with a plurality of the minuscule diffraction grating elements 130 arranged on the surface of the substrate, and the plurality of these diffraction grating elements make up one diffraction grating element group. At least a part of the plurality of diffraction grating elements 130, such as diffraction grating elements 130a, 130b, 130c, 130d, 130α, 130β, 130γ, 130ε, hold the whole or part of the hidden information. These diffraction grating elements 130a, 130b, 130c, 130d, 130α, 130β, 130γ, 130ε have the grating pitch and the grating angle set in such a manner that, upon radiation of the illumination light thereon from a light source having a predetermined area, the illumination light is diffracted and the resulting diffracted light enters a predetermined spatial area. The information recording medium 100 includes a diffraction grating element group having a combination of at least two diffraction grating elements 130 on the one hand and predetermined hidden information is patterned by the sum of the reproduced information in the predetermined spatial area corresponding to the diffraction grating element group at the same time.

The other diffraction grating elements 130x, 130y are dummies holding no hidden information. By mixing the dummy diffraction grating elements 130x, 130y, the presence or absence and the position of the diffraction grating elements 130a, 130b, 130c, 130d, 130α, 130β, 130γ, 130ε holding the hidden information can be concealed.

Figure 17:
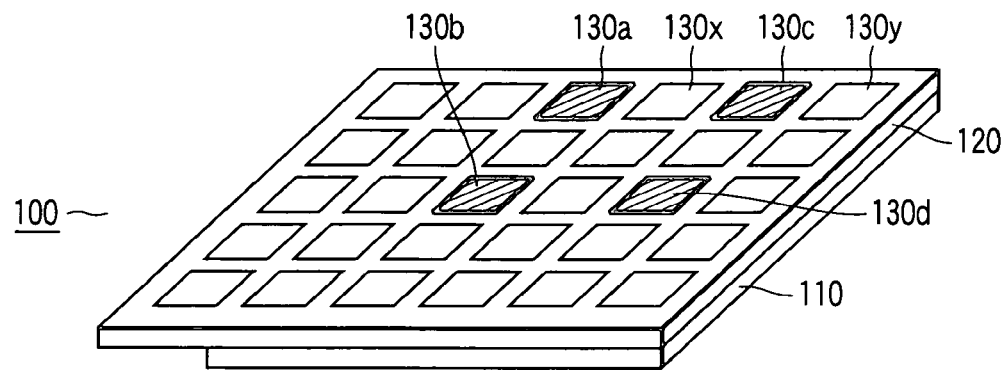
FIG. 17 is a conceptual diagram showing an example of the state in which a predetermined color and a predetermined pattern are arranged on an information supporting layer of the information recording medium according to the second embodiment.

FIG. 17 shows an example of the state in which a predetermined pattern and a predetermined color are arranged on the information supporting layer 110. In the process, a predetermined color is arranged on the information supporting layer 110 on the back of the diffraction grating elements 130a, 130b, 130c, 130d holding the hidden information, and/or on the information supporting layer 110 on the back of the dummy diffraction grating elements 130x, 130y. The same color is not arranged, however, on the diffraction grating elements 130a, 130b, 130c, 130d holding the hidden information and the other areas. A pattern formed by the color arrangement corresponding to the layout of the diffraction grating elements 130a, 130b, 130c, 130d is arranged in a predetermined area of the information supporting layer 11, so that the area holding the hidden information is concealed to make it more difficult to discover the presence or absence and the position thereof.

As described above, the information recording medium 100 according to this embodiment has the hidden information formed of the minuscule diffraction grating elements 130, and therefore, visual recognition is made impossible. Further, the color and pattern arrangement makes it difficult to identify the area recorded with the predetermined hidden information, thereby making it possible to realize a information recording medium difficult to forge.

Figure 18:
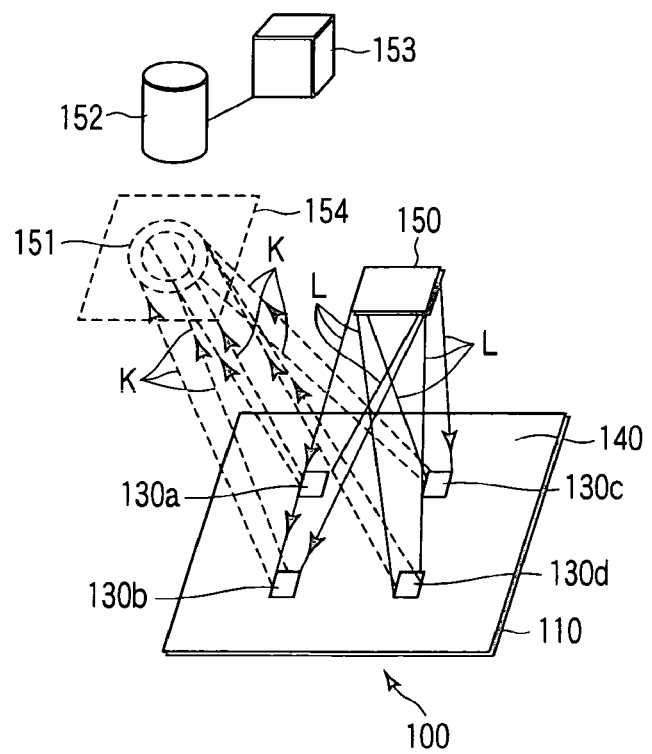
FIG. 18 is a conceptual diagram showing an example of the configuration of an authentication unit according to the second embodiment.

On the other hand, the information recording medium 100 according to this embodiment has an improved detectability of the hidden information using the authentication unit according to this embodiment as the general concept thereof shown in FIG. 18. Thus, the authenticity of the hidden information can be easily determined by the authentication unit.

Figure 19:
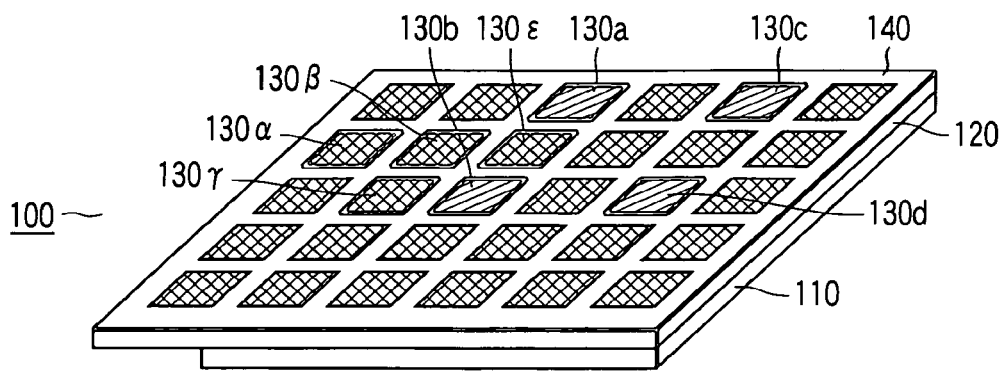
FIG. 19 is a schematic diagram showing another example of the state in which a predetermined color and a predetermined pattern are arranged on the information supporting layer of the information recording medium according to the second embodiment.

Specifically, in the information recording medium according to this embodiment, as shown in FIG. 19, all the diffraction grating elements 130 of the diffraction grating element group 140 hold the whole or part of the hidden information, and only the desired hidden information can be detected according to a predetermined color and pattern arranged on the information supporting layer 110.

More specifically, one diffraction grating element group 140 contains a plurality of pieces of information such as the hidden information desired to be reproduced by the diffraction grating elements 130α, 130β, 130γ, 130ε, in addition to the hidden information reproduced by the diffraction grating elements 130a, 130b, 130c, 130d, and among these information, only the hidden information desired for reproduction can be selected. In the process, the information supporting layer 110 is colored only at the portion thereof where the diffraction grating elements (such as the diffraction grating elements 130a, 130b, 130c, 130d) holding the hidden information desired for detection are arranged, or at the portion thereof where the other diffraction grating elements (for examples, the diffraction grating elements 130α, 130β, 130γ, 130ε) are arranged, or for both of them in an appropriate color. As a result, only the hidden information desired to be read can be detected.

In the case where black is arranged on the information supporting layer 110 corresponding to the diffraction grating elements 130 around the diffraction grating elements 130 holding the hidden information, for example, the brightness value at this particular portion is reduced, and therefore, the brightness level of the diffraction grating elements 130 holding the hidden information is relatively increased for an improved detectability of the hidden information.

In the case where the color of black is arranged on the information supporting layer 110 corresponding to the diffraction grating elements 130 holding the hidden information, on the other hand, the background noise component is suppressed, and therefore, the contrast with the diffracted light is improved for an improved detectability of the hidden information.

Also, in the case where the color of white is arranged on the information supporting layer 110 corresponding to the diffraction grating elements 130 around the diffraction grating elements 130 holding the hidden information, the noise component at this particular place is increased, and therefore, the contrast with the diffracted light is reduced. Thus, the diffracted light from the diffraction grating elements 130 holding the hidden information can be highlighted, thereby improving the detectability of the hidden information.

Also, by arranging the color of white on the information supporting layer 110 corresponding to the diffraction grating elements 130 holding the hidden information, the brightness level at this particular place is increased, and therefore, the detectability of the hidden information can be improved.

In the case where a pattern of a color corresponding to the wavelength of the light used with the device for reading the hidden information (for example, the authentication unit) is arranged on the information supporting layer 110 corresponding to the diffraction grating elements 130 around the diffraction grating elements 130 holding the hidden information, on the other hand, the radiation of the illumination light reduces the contrast of the diffracted light from the surrounding diffraction grating elements 130, thereby making it possible to improve the detectability of the hidden information.

Also, in the case where a pattern of the color complementary to the color corresponding to the wavelength of the light used with the device for reading the hidden information (for example, the authentication unit) is arranged on the information supporting layer 110 corresponding to the diffraction grating elements 130 holding the hidden information, the radiation of the illumination light improves the contrast with the diffracted light, and therefore, the detectability of the hidden information can be improved.

The use of these methods can change the hidden information desired to be read, simply by changing the color and pattern of the information supporting layer 110, and therefore, the hidden information detected for every month, for example, can be changed effectively.

Next, the authentication unit of the information recording medium according to the embodiment shown in FIG. 18 will be explained.

Specifically, the authentication unit according to this embodiment includes at least a light source 150 for radiating illumination light rays L, a reader such as a camera 152 for reading hidden information developed by a combination of light rays K diffracted by the diffraction grating elements 130 from the illumination light rays L, and an authentication unit 6 for authenticating the hidden information based on the result of reading by the reader.

The illumination light rays L having a predetermined light quantity and wavelength distribution from the light source 150 are diffracted into the diffracted light rays K at a designed diffraction angle by the diffraction grating elements 130a, 130b, 130c, 130d in the diffraction grating element group 140 and enter a predetermined spatial area 151. The diffracted light rays K can be detected by, for example, a sensor (not shown) arranged at a predetermined position. Also, a projection screen 7 may be arranged at a predetermined position, and the diffracted light rays K are emitted to the screen 7, so that the presence or absence of a light spot obtained in this way can be detected by taking a picture with the camera 5 or the like.

The color of the planar light source 150 is required to correspond to the color arranged in the diffraction grating elements 130a, 130b, 130c, 130d. Specifically, in the case where a color other than black and white is arranged on the information supporting layer 110 on the back of the diffraction grating elements 130a, 130b, 130c, 130d holding the hidden information desired to be read, the contrast with the diffracted light rays K is required to be increased by the illumination light rays L from the light source 150. Therefore, the illumination light rays L are required to be complementary to the color arranged on the information supporting layer 110. In the case where a color other than black and white is arranged on the information supporting layer 110 on the back of the diffraction grating elements 130 not required to be read, on the other hand, the contrast of the unnecessary diffracted light rays K is required to be reduced to prevent the detection thereof. Therefore, the illumination light rays L are required to be in the same color group as the color of the information supporting layer 110.

Consider the case where the color of the light source is red as an example. In the case where the light source is red in color, cyan complementary to red may be effectively arranged, if any is required, on the information supporting layer 110 on the back of the diffraction grating elements 130a, 130b, 130c, 130d holding the hidden information desired to be read. This is by reason of the fact that the arrangement of the color complementary to the color of the light source suppresses the noise component of the diffraction grating elements 130a, 130b, 130c, 130d desired to be read, and the contrast with the diffracted light rays K emitted by the illumination light rays L is increased. In the case where the diffracted light from the diffraction grating elements 130 not required to be read is to be eliminated, on the other hand, red is arranged on the information supporting layer 110 on the back thereof. Thus, the noise of the diffraction grating elements 130 not required to be read is increased and the contrast with the diffracted light rays K can be reduced, with the result that the detection of the diffracted light rays K is made impossible.

As long as the reader has the function of selecting the wavelength and only the diffracted light rays K having a specific wavelength can be imaged, then the light source 150 is not necessarily capable of emitting the illumination light rays L having a predetermined wavelength distribution as described above but capable of emitting white light. As an alternative, even in the case where the reader has no function of selecting the wavelength, the illumination light rays L from the light source 3 may be filtered for wavelength selection and only the light having the required wavelength component may be radiated.

FIG. 18 shows a method in which the diffraction grating element group 140 including the diffraction grating elements 130a, 130b, 130c, 130d holding the hidden information is utilized in such a manner that the illumination light rays L from a single planar light source 150 are diffracted into four types of light rays K and condensed on a projection screen 154 and this light spot is imaged by a camera 152 or the like. An authentication unit 153 makes a predetermined calculation based on the image picked up by the camera 152, and based on this calculation result, the authenticity of the hidden information is determined.

Figure 20:
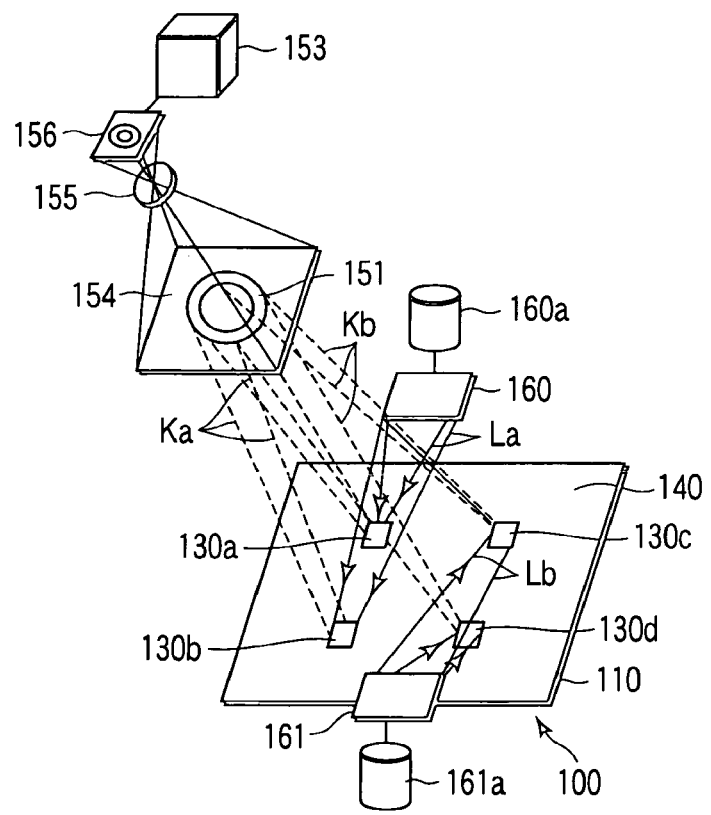
FIG. 20 is a conceptual diagram showing another example of the configuration of the authentication unit according to the second embodiment.

As shown in FIG. 20, on the other hand, the hidden information may be reproduced also by radiating the illumination light rays La, Lb from a plurality of planar light sources 160, 161 arranged in different directions with respect to the diffraction grating element group 140. Specifically, the illumination light ray La is radiated from the light source 160 on the diffraction grating elements 130a, 130b, and a part of the hidden information is reproduced from the diffracted light ray Ka obtained thereby. The diffraction grating elements 130c, 130d, on the other hand, are irradiated with the ultraviolet illumination light ray Lb from the light source 161 in the direction different from the light source 160, so that a part of the hidden information is reproduced from the resulting diffracted light ray Kb. Switching units 160a, 161a are devices for switching the light sources 160, 161, respectively. The diffracted light rays Ka from the diffraction grating elements 130a, 130b and the diffracted light rays Kb from the diffraction grating elements 130c, 130d are both projected on the screen 154. The authentication unit according to an embodiment of this invention has a reading mechanism configured of a lens 155 and an imaging element 156 for reading the data of the predetermined hidden information from the combination of areas of projection on the screen 154.

The image projected on the screen 154 is recorded on the imaging element 156 as hidden information through the lens 155. The authentication unit 153 carries out a predetermined calculation on the image data recorded on the imaging element 156 and determines the authenticity of the hidden information from the result of the calculation.

As explained above, the information recording medium according to this embodiment is so configured that the forgery is difficult and the detectability of the hidden information is improved. By using the authentication unit according to this embodiment, therefore, the hidden information can be accurately read and the authenticity thereof easily determined.

(Third Embodiment)

An image detection apparatus according to a third embodiment of the invention will be explained in detail below with reference to the drawings.

FIG. 21 is a diagram for explaining a general configuration of the image detection apparatus according to the third embodiment of the invention.

As shown in FIG. 21, the image detection apparatus according to this embodiment is configured of a diffused illumination light source, an optical means, an imaging means, a conversion means and a processing means arranged on a concentric circle.

A detected image 2 shown in FIG. 21 is formed of a diffraction grating structure arranged on a sheet of a recording medium 201.

A reflected light ray (the diffracted light in the case under consideration) 209 from the detected image upon radiation of illumination light rays 206, 207, 208 from a plurality of diffused illumination light sources 203, 204, 205 (A, B, C) arranged on the concentric circle is passed through an optical means 210.

At the time of passing through the optical means 210, a reflected light ray (the diffracted light in the case under consideration) 211 of an angle required for image detection is extracted and received by an imaging means 212 configured of a lens 212b and a CCD camera 212a.

Then, the reflected light 211 received is converted into an electrical signal as the detected image information by a conversion means 213 and sent to a processing means 214. In the processing means 214, the detected image information is subjected to the image processing in accordance with a predetermined rule to make a determination on the detected image.

An example of the detected image 202 (read information) according to this embodiment is a code (typically, the bar code or the calra code) making up the entire hidden information with the whole of the reflected and diffracted light of a plurality of the diffraction grating elements, and as long as the whole of the reflected and diffracted light of these diffraction grating elements is not detected, the hidden information cannot be decoded in its entirety.

In view of the fact that the substrate surface is uneven and this unevenness is reflected on and deforms the diffraction grating, however, it is difficult to detect the reflected and diffracted light of the plurality of these diffraction grating elements by the light read from a single point light source. This makes it difficult to detect the whole of the hidden information.

The wording "a part of the hidden information" is defined as a signal such as "1" or "0" constituting a part of the binary data, and "the entire hidden information" defined as the significant information configured of a combination of the signals "1" and "0".

FIG. 22 is a diagram for explaining another configuration of the image detection apparatus according to this embodiment. This image detection apparatus includes an annular diffused light source illumination means.

A detected image 222 shown in FIG. 22 is formed of a protruded structure arranged on a recording medium 221 with paper as a base material. The protruded structure is formed by intaglio printing. The image formed by intaglio printing, or especially, an intaglio latent image cannot be picked up at other than an appropriate angle with the light radiated at an appropriate radiation angle.

As shown in FIG. 22, the light can be easily radiated at an appropriate angle by use of an annular diffused light source illumination 223 and an optical means 226. A reflected light 225 emitted from the detected image upon receipt of an illumination light 224 from the annular diffused light source illumination 223 after being passed through the optical means 226 only in an appropriate angular range is received by an imaging means 227 configured of a lens 227b and a CCD camera 227a.

The reflected light 225 thus received is converted into an electrical signal as the detected image information by a conversion means 228, and sent to a processing means 229. In the processing means 229, the detected image information is subjected to the image processing in accordance with a predetermined rule and the determination is made on the detected image.

The image detection apparatus according to the present invention is not only usable for authenticating securities, licenses, passports, etc., but also applicable to the printing quality control of lithograph and intaglio printing difficult to control or the management of parts and serial numbers required for quantity control.

The best mode for carrying out the invention has been explained above with reference to the accompanying drawings. Nevertheless, this invention is not limited to these configurations, but various modifications and alterations of the invention can be conceived by those skilled in the art without departing from the scope of the technical concept of the invention described in the appended claims, and such modifications and alterations are understood to be included in the technical scope of the invention.

What is claimed is:

1. An information recording medium, comprising:
   an arrangement of diffraction grating cells constituting cells each formed of a diffraction grating, wherein
   the information recording medium has an uneven surface and the diffraction grating cells are arranged on the uneven surface of the information recording medium,
   a plurality of types of the diffraction grating cells make up one information recording area,
   two or more types of the diffraction grating cells included in the diffraction grating cells making up the information recording area are information recording elements,
   two or more types of the diffraction grating cells included in the diffraction grating cells making up the information recording area are information hiding elements,
   at least one of the diffraction grating cells included in the diffraction grating cells making up the information recording area is dummy,
   the diffraction grating cells of different types included in the diffraction grating cells making up the information recording area are configured of diffraction gratings having different grating angles from each other,
   information is recorded in a two-dimensional arrangement of the diffraction grating cells constituting the information recording elements in the information recording area, when the diffraction grating cells are irradiated with an illumination light from a light source, only one diffraction grating light ray is emitted from one diffraction grating cell, and the illumination light is a diffused illumination light that irradiates the diffraction grating cell in a plurality of angles and the diffraction light ray diffracts and diverges in a certain degree.

2. The information recording medium according to claim 1, wherein the grating angle between the diffraction grating cells of different types included in the diffraction grating cells making up the information recording area has a predetermined difference or a difference an integer multiple of the predetermined difference.

3. The information recording medium according to claim 1, wherein the diffraction grating cells of different types included in the diffraction grating cells making up the information recording area are configured of diffraction gratings having the same grating pitch.

4. The information recording medium according to claim 1, wherein the diffraction grating cells of at least two different types included in the diffraction grating cells making up the information recording area are configured of diffraction gratings having different grating pitches.

5. The information recording medium according to claim 1, wherein the information recording elements and the information hiding elements included in the diffraction grating cells making up the information recording area are configured of diffraction gratings having different grating pitches.

6. The information recording medium according to claim 1, wherein a plurality of the information recording areas are arranged, and the types of the diffraction grating cells arranged as the information recording elements fail to coincide with each other in at least two information recording areas included in the information recording areas.

7. The information recording medium according to claim 1, wherein the diffraction grating cells arranged as information recording elements in one of said plurality of information recording areas are arranged as information hiding elements in another one of the information recording areas.

8. The information recording medium according to claim 1, wherein a plurality of diffraction grating cells included in at least one of the information recording elements and the information hiding elements are arranged in the areas other than the information recording area.

9. The information recording medium according to claim 1, wherein at least any one of a character, a pattern and an image is displayed with the diffraction grating cells as pixels.

10. A system for authenticating hidden information comprising:

an information recording medium on which the hidden information is recorded, the information recording medium including a first layer and a transparent second layer stacked on the first layer and including a light reflection layer, the second layer having an uneven surface, wherein a plurality of miniscule diffraction grating elements each having a diffraction grating holding the whole or part of hidden information, and a plurality of miniscule diffraction grating elements each having a diffraction grating holding dummy information irrelevant to the hidden information, are arranged on the surface of the second layer, a grating pitch and a grating angle are set in such a manner that the whole or part of light rays diffracted by the diffraction grating elements based on the illumination light from a light source enter a predetermined spatial area, and in the case where the whole or part of the diffraction light rays from a diffraction grating element group including a combination of at least two diffraction grating elements among the plurality of miniscule diffraction grating elements each having a diffraction grating holding the whole or part of hidden information enter the predetermined area, and a sum of reproduction information in the predetermined area is developed as predetermined one or plurality of hidden information, and a predetermined color and a predetermined pattern are arranged on the first layer in accordance with arrangement of the diffraction grating elements holding the hidden information; and an authentication apparatus, the authentication apparatus including:

a light source which radiates illumination light rays of a color in the same color group as or complementary to a predetermined color of a pattern arranged on a first layer corresponding to diffraction grating elements holding the hidden information and on the first layer corresponding to diffraction grating elements around the diffraction grating elements holding the hidden information;

reading means for reading the hidden information developed by a combination of the light rays diffracted, through the diffraction grating elements, from the illumination light rays radiated on the diffraction grating elements from the light source; and authentication means for authenticating the hidden information based on the information read by the reading means.

11. A system for authenticating hidden information comprising:

an information recording medium on which the hidden information is recorded, the information recording medium including a first layer and a transparent second layer stacked on the first layer and including a light reflection layer, the second layer having an uneven surface, wherein a plurality of miniscule diffraction grating elements each having a diffraction grating holding the whole or part of hidden information, and a plurality of miniscule diffraction grating elements each having a diffraction grating holding dummy information irrelevant to the hidden information, are arranged on the surface of the second layer, a grating pitch and a grating angle are set in such a manner that the whole or part of light rays diffracted by the diffraction grating elements based on the illumination light from a light source enter a predetermined spatial area, and in the case where the whole or part of the diffraction light rays from a diffraction grating element group including a combination of at least two diffraction grating elements among the plurality of miniscule diffraction grating elements each having a diffraction grating holding the whole or part of hidden information enter the predetermined area, and a sum of reproduction information in the predetermined area is developed as predetermined one or plurality of hidden information, and a predetermined color and a predetermined pattern are arranged on the first layer in accordance with arrangement of the diffraction grating elements holding the hidden information, wherein a pattern having a color corresponding to a wavelength of light radiated at the time of reading the hidden information is arranged on the first layer corresponding to the diffraction grating elements around the diffraction grating elements holding the hidden information; and an authentication apparatus, the authentication apparatus including:

a light source which radiates illumination light rays of a color in the same color group as or complementary to a predetermined color of a pattern arranged on a first layer corresponding to diffraction grating elements holding the hidden information and on the first layer corresponding to diffraction grating elements around the diffraction grating elements holding the hidden information;

reading means for reading the hidden information developed by a combination of the light rays diffracted, through the diffraction grating elements, from the illumination light rays radiated on the diffraction grating elements from the light source; and authentication means for authenticating the hidden information based on the information read by the reading means.

12. A system for authenticating hidden information comprising:

an information recording medium on which the hidden information is recorded, the information recording medium including a first layer and a transparent second layer stacked on the first layer and including a light reflection layer, the second layer having an uneven surface, wherein a plurality of minuscule diffraction grating elements each having a diffraction grating holding the whole or part of hidden information, and a plurality of miniscule diffraction grating elements each having a diffraction grating holding dummy information irrelevant to the hidden information, are arranged on the surface of the second layer, a grating pitch and a grating angle are set in such a manner that the whole or part of light rays diffracted by the diffraction grating elements based on the illumination light from a light source enter a predetermined spatial area, and in the case where the whole or part of the diffraction light rays from a diffraction grating element group including a combination of at least two diffraction grating elements among the plurality of miniscule diffraction grating elements each having a diffraction grating holding the whole or part of hidden information enter the predetermined area, and a sum of reproduction information in the predetermined area is developed as predetermined one or plurality of hidden information, and a predetermined color and a predetermined pattern are arranged on the first layer in accordance with arrangement of the diffraction grating elements holding the hidden information, wherein a pattern having a color complimentary to the color corresponding to a wavelength of light radiated at the time of reading the hidden information is arranged on the first layer corresponding to the diffraction grating elements around the diffraction grating elements holding the hidden information; and an authentication apparatus, the authentication apparatus including:

a light source which radiates illumination light rays of a color in the same color group as or complementary to a predetermined color of a pattern arranged on a first layer corresponding to diffraction grating elements holding the hidden information and on the first layer corresponding to diffraction grating elements around the diffraction grating elements holding the hidden information;

reading means for reading the hidden information developed by a combination of the light rays diffracted, through the diffraction grating elements, from the illumination light rays radiated on the diffraction grating elements from the light source; and authentication means for authenticating the hidden information based on the information read by the reading means.

13. The system according claim 10, wherein a function of selecting wavelength is added to the reading means.

14. The system according claim 11, wherein a function of selecting wavelength is added to the reading means.

15. The system according claim 12, wherein a function of selecting wavelength is added to the reading means.

16. An information recording medium, comprising:

an arrangement of diffraction grating cells constituting cells each formed of a single diffraction grating, wherein the information recording medium has an uneven surface and the diffraction grating cells are arranged on the uneven surface of the information recording medium, a plurality of types of the diffraction grating cells make up one information recording area, two or more different types of the diffraction grating cells included in the diffraction grating cells making up the information recording area are information recording elements, two or more different types of the diffraction grating cells included in the diffraction grating cells making up the information recording area are information hiding elements, at least one of the diffraction grating cells included in the diffraction grating cells making up the information recording area is dummy, the diffraction grating cells of different types included in the diffraction grating cells making up the information recording area are configured of diffraction gratings having different grating angles from each other and having different grating angles from each of the two or more different types of the diffraction grating cells that are the information hiding elements, information is recorded in a two-dimensional arrangement of the diffraction grating cells constituting the information recording elements in the information recording area, when the diffraction grating cells are irradiated with an illumination light from a light source, only one diffraction grating light ray is emitted from one diffraction grating cell, and the illumination light is a diffused illumination light that irradiates the diffraction grating cell in a plurality of angles and the diffraction light ray diffracts and diverges in a certain degree.

* * * * *

UNITED STATES PATENT AND TRADEMARK OFFICE
CERTIFICATE OF CORRECTION

PATENT NO. : 9,333,797 B2  Page 1 of 1
APPLICATION NO. : 14/306733
DATED : May 10, 2016
INVENTOR(S) : Toda et al.

It is certified that error appears in the above-identified patent and that said Letters Patent is hereby corrected as shown below:

In the claims,

Claim 13, Column 22, Line 14:
After "according" insert -- to --.

Claim 14, Column 22, Line 16:
After "according" insert -- to --.

Claim 15, Column 22, Line 18:
After "according" insert -- to --.

Signed and Sealed this
Nineteenth Day of July, 2016

Michelle K. Lee
*Director of the United States Patent and Trademark Office*